July 28, 1964
N. B. DURHAM
3,142,516
DUAL WHEEL ASSEMBLY
Filed Feb. 20, 1963
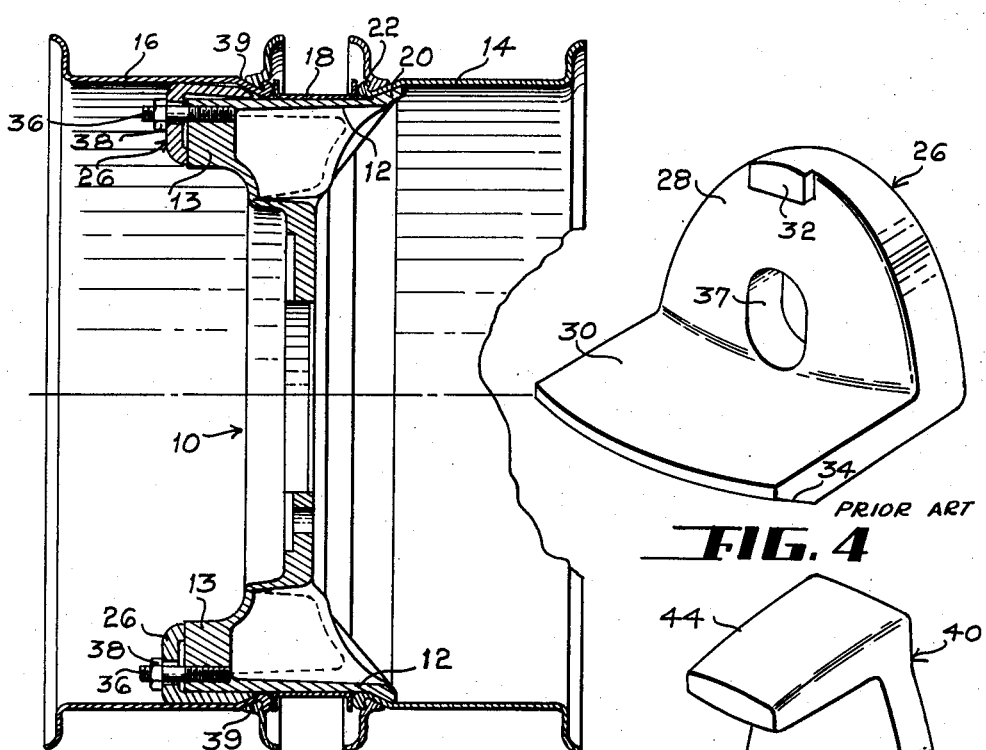
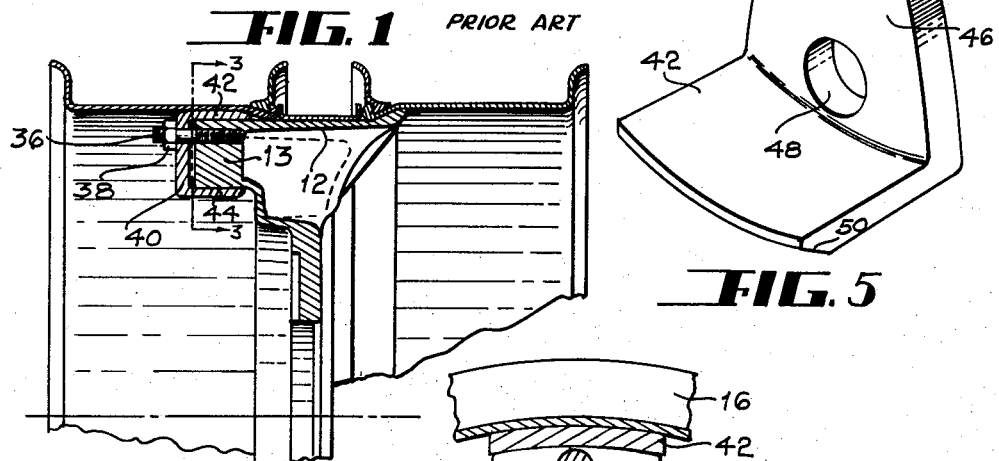
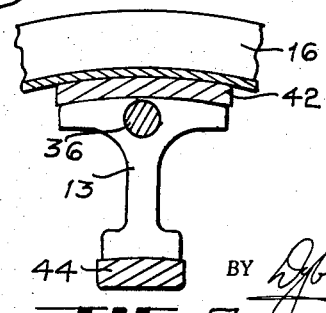
INVENTOR.
NOLAN B. DURHAM
BY
HIS ATTORNEYS United States Patent Office 3,142,516
Patented July 28, 1964

1

3,142,516
DUAL WHEEL ASSEMBLY
Nolan B. Durham, 5287 Ormand Road, Dayton 49, Ohio, assignor of one-half to James Knox, Dayton, Ohio
Filed Feb. 20, 1963, Ser. No. 259,884
3 Claims. (Cl. 301—13)

This invention relates to a dual wheel assembly and more particularly to an improved clamp construction for use in securing dual rims on the spider of a dual wheel assembly, however, the invention is not necessarily so limited.

One of the chief problems encountered in the use of dual wheel assemblies of the type frequently employed on modern tractor-trailer units results from a difficulty in establishing and maintaining alignment of the dual tire rims mounted on the dual wheel spider. For convenience of repair, it is important that the tires and rims be quickly detachable from the dual wheel spider and quickly replaceable thereon. At the same time, the wheel construction must be capable of establishing concentricity of the tire rims on the spider and must also be capable of preventing any cocking of the rim on the spider.

In a conventional construction, the two rims with an intermeditae spacer element are fitted onto the outer periphery of a supporting spider and this assembly of rims and a spacer element is clamped securely on the spider by means of a plurality of clamps which are bolted to the spider and which have wedge portions engaging the outboard rim of the dual wheel assembly. These wedge portions are intended to compress the rims and spacer element tightly together and, at the same time, locate the outboard rim in a concentric position on the spider. It is found in practice, however, that one or more clamps are sometimes cocked as they are drawn into position by their securing bolts, with the result that the outboard rim is not supported in a position of true concentricity and may even be cocked out of its proper operating position. Frequently, this improper alignment is not evident upon inspection of the assembled wheel; but becomes manifest only after the dual wheel has been operated under load, so as to cause the outboard rim to slip into a cocked posiiton, due to inadequate support from the wheel clamps.

An object of the present invention is to provide a new and improved clamp for securing the rims of dual wheel assemblies.

Another object of the present invention is to provide a new and improved spider and wheel clamp assembly so designed that cocking of the clamp on the spider is substantially precluded.

Other objects and advantages reside in the construction of parts, the combintaion thereof, the method of manufacture and the mode of operation, as will become more apparent from the following description.

In the drawings,

FIGURE 1 is a sectional view, with a portion cut away, illustrating a dual wheel assembly of the type commonly employed in the prior art.

FIGURE 2 is a fragmentary sectional view, analogous to that of FIGURE 1, illustrating the improvement of the present invention.

FIGURE 3 is a sectional view, taken substantially along the line 3—3 of FIGURE 2.

2

FIGURE 4 is an enlarged perspective view of the prior art wheel clamp.

FIGURE 5 is an enlarged perspective view of the improved wheel clamp.

Referring to the drawing in greater detail, the reference numeral 10 designates a conventional type of dual wheel spider which is adapted to be secured by bolts (not shown) to a hub on a vehicle axle (not shown).

This spider, which is typically cast in one piece, has an outer periphery which includes a plurality of circumferentially spaced, axially extending and partially hollow ribs 12 separated by intermediate scallops of reduced radial dimension. The illustration of FIGURE 1 is a sectional view taken along a surface passing through the axis of the spider and passing centrally through diametrically disposed ribs 12 and, accordingly, the scallops do not appear in the drawing.

The circumferentially spaced ribs 12 cooperatively form a segmental cylindrical outer seating surface which receives rims 14 and 16, each of which is adapted to receive one tire for the dual wheel assembly. When the spider and rims have been assembled on a vehicle, the rim 14 is an outboard rim and the rim 16 is in inboard rim. The ribs 12 also receive an annular spacer 18, located intermediate the rims 14 and 16 and functioning to separate the rims a predetermined distance.

The inboard margins of the ribs 12 at the outer surfaces thereof terminate in outwardly diverging lips 20, adapted to interfit a complementary beveled shoulder 22 located at the outboard side of the inner periphery of the rim 14. As will become apparent in the following description, these interfitting beveled surfaces are used to center the inboard rim 14 on the spider 10.

On the outboard side, each of the ribs 12 has an axial extension 13 adapted to be engaged by a wheel securing clamp 26, a prior art clamp being illustrated in FIGURES 1 and 4. This prior art clamp is of generally L-shaped configuration, there being one leg 28 adapted to overlie the end of the extension 13 and another leg 30 adapted to overlie the outer surface of the extension 13. The leg 28 is provided with a boss or abutment 32 adjacent the outer end thereof, which is adapted to bear against the end face of the extension 13. The outer end of the leg 30 has a beveled portion 34 in its upper surface, which, as described subsequently, is used in wedging the outboard rim 16 to a concentric position on the spider 10.

Each clamp 26 is adapted to be drawn securely onto the end of its respective rib 12 by means of a stud $36_A$ penetrating an aperture 37 in the clamp 26 and threadedly engaging the extension 13 and a nut 38 which is used to advance the clamp inwardly. As the clamp 26 is advanced inwardly, the beveled portion 34 on the leg 30 engages a complementary annular beveled shoulder 39, located at the inboard side of the inner periphery of the rim 16. The intended mode of operation is that with a plurality of clamps 26, one for each of the ribs 12, advanced inwardly on their respective ribs 12, the beveled portions 34 will cooperate to wedge the outboard rim 16 to a concentric position on the spider 10, while simultaneously forcing the inboard rim 14 against the annular lips 20, simultaneously placing the inboard rim 14 at a position of concentricity on the spider 10.

The essential benefit of this design for a dual wheel assembly is that both tires and rims are quickly removable upon removal of the securing clamps 26. Due to manufacturing tolerances, however, not all rims and spacers have precisely the same dimensions and, accordingly, the advancement of the securing clamps 26 onto the extensions 13 will vary, depending upon the dimensions of the particular rims and spacer employed. To allow for this variation, it is necessary that the clamps 26 have slightly oblong apertures 37 for receiving the studs 36, the oblong apertures permitting the clamps to pivot to a limited extent about the abutments 32.

The cocked condition illustrated in exaggerated detail in the upper part of FIGURE 1 arises when the operator advances one or more of the clamps 26 too rapidly with respect to the other clamps, forcing the rim to assume an eccentric or cocked position. Frequently, this condition is not apparent, even with a careful inspection, until the dual wheel assembly has been driven for several miles and the outboard rim has shifted to its most stable position.

A particularly harmful effect resulting from this cocked condition, commonly referred to as "rim slipping," results from an inadequate axial pressure on the rims. Thus, as the clamp cocks, the pressure applied by the stud 36 is directed primarily against the abutment 32 and only inefficiently against the outboard rim 16. As a consequence, the rims are insecurely fastened. As a further consequence, the stud 36 receives a bending torque which is sometimes destructive of the stud.

The present invention precludes the foregoing difficulty by permitting a variable advancement of the clamp onto the axial extension 13 of the rib 12 and, at the same time, preventing any cocking or pivotal movement of the clamp. The construction which enables this mode of operation is illustrated in FIGURES 2, 3 and 5. FIGURE 5 illustrates a modified clamp 40, which is of generally U-shape, the clamp having parallel legs 42 and 44 adapted to seat on the outer and inner surfaces respectively of the rib 12. The legs 42 and 44 are supported in spaced parallel relation by a base portion 46 having an aperture 48 for receiving the stud 36 upon assembly. For centering the outboard rim 16, the leg 42 has a beveled margin 50 at the outer end of the outer surface thereof. To prevent cocking of the clamps 40, the legs 42 and 44 are spaced accurately, within tolerances, to snugly fit the outer and inner surfaces of the extensions 13 on the ribs 12.

To facilitate this accurate fit, the inner surfaces of the extensions 13 may be milled to a common radius using a cutting tool rotating about the axis of the spider 10. This is a departure from the prior art structures, wherein the dimensions of the inner surfaces of the extensions 13 are unimportant. It will be recognized, of course, that the milling operation just discussed is most applicable to the conversion of existing wheel spiders of the type herein disclosed for use with the improved clamps herein disclosed. In manufacturing new wheel spiders, the need for such milling is eliminated by building the necessary dimensional tolerances into the casting dies which are used to produce the wheel spiders.

In the preferred embodiment, the opposing faces of the legs 42 and 44 in the clamp are curved to fit the curvatures of the outer and inner surfaces, respectively, of the extensions 13, this condition being clearly shown in FIGURE 3. It is recognized, of course, that the inner and outer surfaces of the extensions 13, especially the inner surfaces, may be formed with a different shape than that illustrated, and it is deemed within the purview of the present invention to modify the shapes of the opposing surfaces of the legs 42 and 44 accordingly.

In accordance with the design of the modified clamp illustrated herein, it will be noted that as the leg 42 is advanced against the outboard side of the rim 16 and pressure is applied to this rim, the clamp will tend to rotate in a counterclockwise direction, as viewed in FIGURE 2. This tendency for rotation is resisted by the inner leg or heel 44 which bears against the inner surface of the extension 13. Obviously, with increasing length in the inner leg 44, the ability of the clamp 40 to resist rotation is increased. Accordingly, in the preferred practice of the present invention, the inner leg 44 is made approximately as long as the leg 42.

From the foregoing description, it is apparent that the present invention involves a wheel clamp and wheel spider construction wherein cocking of the clamp and consequent misalignment of the rim is substantially eliminated. Inasmuch as the cocking condition has been eliminated, it will also be apparent that the axial tension that must be developed in the stud 36 to adequately secure the rims against slippage has been reduced and, in consequence, the likelihood of failure of the stud is reduced accordingly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a wheel assembly, the combination comprising a wheel spider having a peripheral seating surface adapted to receive thereon a rim having a beveled shoulder in the inner periphery thereof, said seating surface terminating with an axial extension having radially spaced axially parallel inner and outer surfaces, and a clamp assembly engaging said axial extension to secure said rim on said spider, said clamp assembly including a member having parallel legs and a base engaging one end of each said leg to support said legs in spaced relation, one of said legs having a bevel in the outer surface thereof located at the end thereof which is distal from said base, said clamp being disposed on said axial extension with said one leg overlying and contacting the outer surface of said extension and the other leg underlying and contacting the inner surface of said extension whereby both legs derive bearing support from said extension, the bevel on said one leg being adapted to interfit the beveled shoulder on said rim, said base overlying the end of said extension, and fastener means interengaging said clamp member and said extension, said fastener means being adjustable to drive said clamp member inwardly on said extension so as to bias the bevel on said one leg against the beveled shoulder of said rim.

2. In a wheel assembly, the combination comprising a wheel spider having a peripheral, axially extending rib establishing a peripheral seating surface adapted to receive thereon a rim having a beveled shoulder in the inner periphery thereof, said rib terminating with an axial extension having radially spaced axially parallel inner and outer surfaces, and a clamp assembly engaging the axial extension of said rib to secure said rim on said spider, said clamp assembly including a generally U-shaped member having parallel legs and a base engaging one end of each said leg to support said legs in spaced relation, said base having an aperture therein intermediate said legs, one of said legs having a bevel in the outer surface thereof located at the end thereof which is distal from said base, said clamp being disposed on the axial extension of said rib with said one leg overlying and contacting the outer surface of said extension and the other leg underlying and contacting the inner surface of said extension whereby both legs derive bearing support from said extension, said base overlying the end of said extension, the bevel on said one leg being adapted to interfit the beveled shoulder on said rim, and fastener means passing through the aperture in said base to engage the end of said extension, said fastener means being adjustable to drive said clamp inwardly on said extension so as to bias the bevel on said one leg against the beveled shoulder of said rim.

3. The combination according to claim 2, wherein the inner and outer surfaces of said extension are each cylindrical segments concentric to the axis of said spider and wherein the opposing surfaces of said clamp are cylindrical segments, the cylindrical surface of said one leg being adapted to interfit the outer cylindrical surface of said extension and the cylindrical surface of the other leg of said clamp being adapted to interfit the inner surface of said extension.

References Cited in the file of this patent

UNITED STATES PATENTS

| | | |
|---|---|---|
| 1,103,813 | Murray | July 14, 1914 |
| 1,679,454 | Wagenhorst | Aug. 7, 1928 |
| 2,653,057 | Sherman | Sept. 22, 1953 |
| 2,874,997 | Brink | Feb. 24, 1959 |

FOREIGN PATENTS

| | | |
|---|---|---|
| 2,204,110 | France | Aug. 3, 1959 |